United States Patent [19]

Courtney

[11] Patent Number: 4,654,936
[45] Date of Patent: Apr. 7, 1987

[54] FASTENER HOOK

[76] Inventor: Albert L. Courtney, 1601 Gulf St., Lamar, Mo. 64759

[21] Appl. No.: 867,077

[22] Filed: May 27, 1986

[51] Int. Cl.$^4$ ............................................. F16G 11/04
[52] U.S. Cl. ............................ 24/230.5 W; 24/230.5 R; 59/85
[58] Field of Search .................. 24/230.5 R, 230.5 W, 24/230.5 TP, 230.5 AD, 67.9, 300; 248/317, 318; 152/141, 142, 143; 59/85

[56] References Cited

U.S. PATENT DOCUMENTS

| 545,043 | 8/1895 | Attwood et al. | 24/230.5 R |
| 1,006,131 | 10/1911 | Roach | 59/85 |
| 1,310,947 | 7/1919 | Hamrick | 24/230.5 R |
| 1,511,002 | 10/1924 | Pfautz | 59/85 |
| 1,719,662 | 7/1929 | Jones | 59/85 |
| 1,879,991 | 9/1932 | Pratt | 24/300 |
| 2,177,816 | 10/1939 | Wertman | 59/85 |
| 3,579,746 | 5/1971 | Marik | 24/230.5 W |
| 3,633,253 | 1/1972 | Ellis | 24/67.9 |
| 4,123,900 | 11/1978 | Sadowski | 59/85 |
| 4,135,693 | 1/1979 | Miavitz | 24/230.5 AD |

Primary Examiner—Victor N. Sakran
Attorney, Agent, or Firm—John A. Hamilton

[57] ABSTRACT

A fastener hook for joining a flexible line to any target object capable of being engaged by a hook, and consisting of a generally planar, rigid body having a generally spiral slot of more than 360 degrees angular extent formed therein, the slot opening through an edge of the body to be engageable over the target object and closed at its opposite end, and an elongated connector joined at one end to the body member within the confines of the spiral slot for rotation about an axis normal to the body, and being connectable at its opposite end to the flexible line.

9 Claims, 12 Drawing Figures

FIG. 1

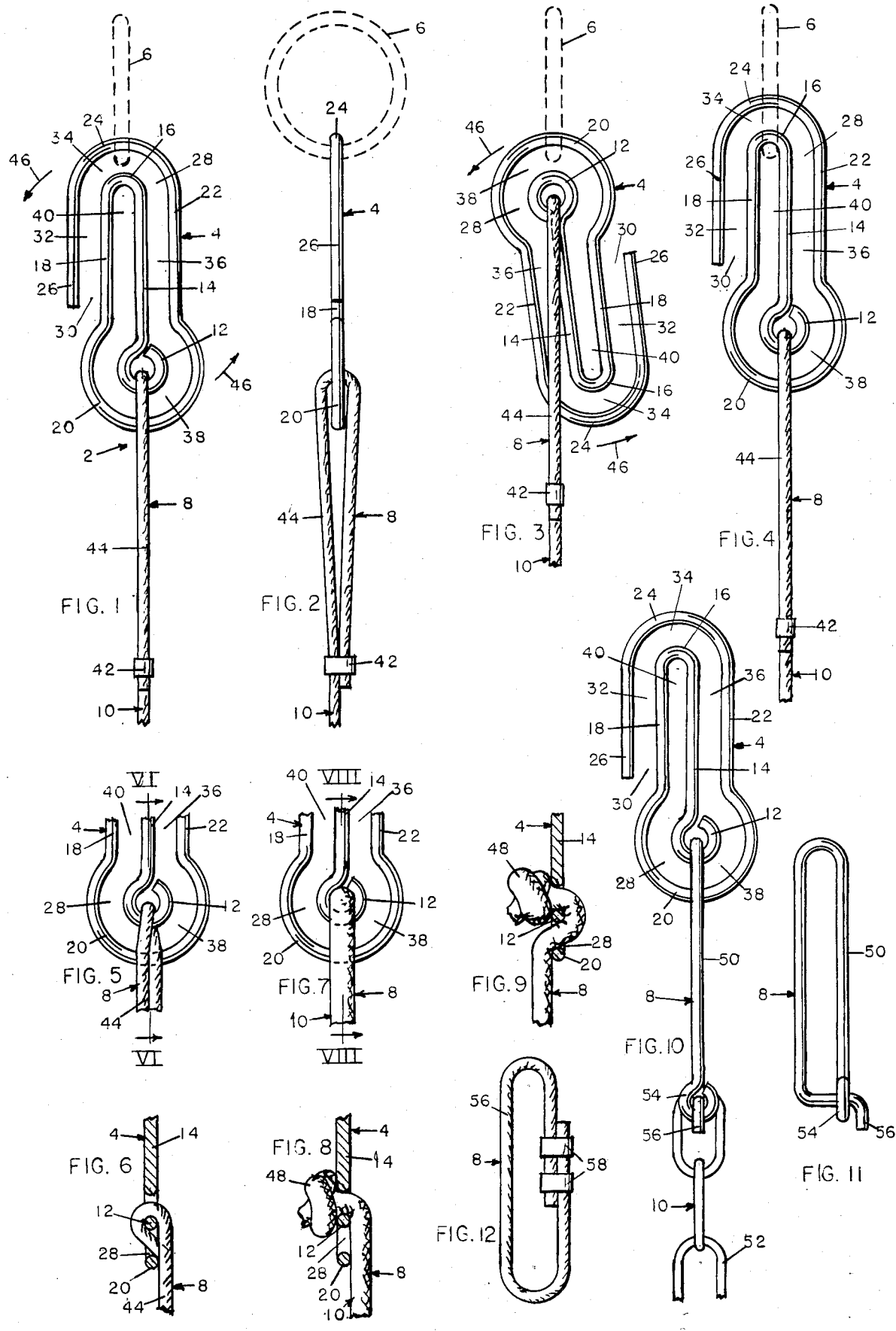

FASTENER HOOK

This invention relates to new and useful improvements in fastener hooks, and relates generally to a hook operable to connect an end of a flexible cord, rope, chain, strap or the like to any object capable of being engaged by a hook. One example of use might be the attachment of a leash to a dog collar, but the actual possible usages are virtually numberless.

The overall object of the present invention is the provision of a fastener hook which, while extremely simple and being of what would ordinarily be regarded as of one-piece construction, is nevertheless substantially self-locking in operation, in that once engaged, any accidental disengagement thereof is extremely unlikely. Many prior hook fasteners have locking means of one sort or another, such for example as a leaf spring extending across the mouth of the hook but being manually deflectable to open the mouth for engagement or disengagement of the hook, or a rigid lock bar extending across the mouth of the hook but being retractable against a spring to open the hook. However, such prior hooks have nearly always been subject to certain disadvantages, such as springs too strong for operation by many person's fingers, or springs which break and permit accidental disengagement of the hook, or the clogging by rust or dirt of mechanical arrangements, eventually leading to inoperability of the hook. These malfunctions are virtually impossible with the present hook. Generally, this object is accomplished by the provision of a special hook body formed of a single length of wire, rigid in actual use, formed in a single plane to present, in sequence, a closed eye, a first leg extending radially from the eye, a re-entrant bight opening toward said eye, a second leg parallel to and spaced apart from the first leg, a second bight curved concentrically about the eye, a third leg parallel to and spaced apart from the first leg, and a third bight concentrically surrounding said first bight. A line to which the hook body is to be permanently attached is engaged in the eye, and the first and third bights are engageable over any object capable of being engaged by a hook. This form of the wire provides a channel between successive reaches, which channel opens exteriorly of the hook body and which extends inwardly, in three reaches, to end inside of the third bight. Thus, when the third bight is engaged over any object, and the hook body rotated in its own plane, the object is moved to the closed end of the channel, and the channel is blocked against accidental reverse movement of the object by the proximity of the line to one or both sides of the hook body. The hook body must of course be rotatable in its own plane relative to the line engaged in the eye thereof.

A further object is the provision of a fastener hook of the character described in which the line engaged in the eye of the hook body is in the form of a loop or link, whereby the reaches thereof will be disposed at both sides of the plane of the hook body, in order better to prevent accidental reverse movement of the engaged object through the channel of the hook body.

Another object is the provision of a fastener hook of the character described in which the line permanently attached to the hook body is pliably flexible, whereby it may be deflected to enter the channel in following relation to the object being engaged by the hook. This provides that the line then projects through and blocks the channel, in order to provide a further "safety" against accidental reverse movement of the hooked object through the channel.

Other objects are simplicity and economy of construction, efficiency and dependability of operation, and adaptability for use in a wide variety of circumstances.

With these objects in view, as well as other objects which will appear in the course of the specification, reference will be had to the accompanying drawing, wherein:

FIG. 1 is a side elevational view of a fastener hook embodying the present invention, showing it initially engaged with a target object shown in dotted lines, FIG. 2 is an edge view of the parts as shown in FIG. 1, FIG. 3 is a view similar to FIG. 1, but showing the hook body turned through about half the rotary movement thereof necessary to engage it fully with the target object, FIG. 4 is a view similar to FIG. 3, but showing the hook body fully turned to complete its engagement with the target object, FIG. 5 is a fragmentary view similar to FIG. 4, but showing the attaching line arranged to provide additional security of the connection against accidental disengagement, FIG. 6 is a sectional view taken on line VI—VI of FIG. 5, FIG. 7 is a fragmentary view similar to FIG. 4, but showing a modification of structure, FIG. 8 is a sectional view taken on line VIII—VIII of FIG. 7, FIG. 9 is a view similar to FIG. 8, but showing the attaching line arranged to provide additional security of the connection against accidental disengagement, FIG. 10 is a view similar to FIG. 1, but showing another modification of structure, FIG. 11 is a face view of a special connecting link utilized in FIG. 10, and FIG. 12 shows another special link usable in FIG. 10.

Like reference numerals apply to similar parts throughout the several views. In FIG. 1, a fastener hook embodying the present invention is indicated generally by the numeral 2, and comprises a hook body 4 adapted to be engaged with any target object capable of being engaged by a hook, said target object here being illustrated as a ring 6, and a connector 8 joining hook body 4 permanently to the free end of a flexible line 10, which may be a cord, rope, strap, chain or the like.

Hook body 4 is formed of a single length of wire, of sufficient strength to remain substantially rigid under the stresses applied thereto in normal use, permanently formed in a single plane to provide first a substantially closed eye 12, and then, successively, a first leg 14 extending radially from the eye, a first reentrant bight 16 opening toward eye 12, a second leg 18 parallel to but spaced apart from leg 14, a second reentrant bight 20 concentrically surrounding eye 12, a third leg 22 extending parallel to but spaced apart from first leg 14 at the side there of opposite from leg 18, a third reentrant bight 24 concentrically surrounding bight 16, and a terminal leg 26 extending parallel to leg 18. The wire forming the hook body defines a channel indicated generally by the numeral 28, said channel being of substantially uniform width through out its length, having an end opening 30 which opens exteriorly of the hook body and faces toward the end of the body enclosing eye 12, and then presents, in sequence, a straight portion 32 between wire legs 18 and 26, a curved portion 34 between wire bights 16 and 24, a straight portion 36 between wire legs 14 and 22, a curved portion 38 between wire bight 20 and eye 12, and a straight terminal portion 40 terminating in a closed end within wire bight 16. Thus it will be seen that channel 28 is of an angular extent at least greater than 360 degrees, having a generally U-shaped first curve adjacent the entry end thereof, a reversed generally U-shaped second curve at its opposite end, with its terminal portion projecting within the first curve, and that connector member 8 is joined to the hook body within the second curve. While it is convenient and economical to form the hook body of a single length of wire, as shown, it will be apparent that said body could alternatively be formed by stamping from a flat plate stock, if desired.

Basically, hook body 4 may be said to be generally planar, and that channel 28 constitutes a generally spiral slot cut from the planar body, the spiral slot opening through an edge of the body, being of at least 360 degrees in angular extent, and being closed at its inner end, with the connector member 8 being joined to the body member internally of the spiral form of the channel. More specifically, the generally spiral form of the channel is somewhat elongated in one direction in the plane of the body, with the closed end of the channel and the point of attachment of the connector member being disposed adjacent the respectively opposite ends of the elongated form.

In FIGS. 1–4, the target object 6 is represented as a closed ring into which the hook is to be engaged, but said target object may in fact be any object through which the terminal leg 26 of the hook body may be inserted, and which may be passed through the length of channel 28 of the hook body. In FIGS. 1–6, the flexible line 10 which is to be attached to target object 6 by the hook is a pliably flexible cord or rope, and the connector member 8 joining it to the hook is simply an extended portion of the cord, threaded through eye 12, then doubled on and secured to its own standing portion by a clip 42 or other suitable fastener to form a closed loop 44 of the cord, the loop being threaded through the eye.

In operation, to engage the hook, terminal leg 26 of the hook body wire is first inserted through target object 6, so that the object comes to rest in curved portion 34 of the channel 28 between wire bights 16 and 24, as shown in FIGS. 1 and 2. This represents an initial engagement only of the hook, this engagement being quite insecure since the entry or throat 30 of the hook is in no way blocked or obstructed against the accidental escape of object 6 therethrough. To complete the attachment to a higher degree of security, hook body 4 is grasped and turned through a full 360 degrees, or one full turn, in its own plane, in the direction indicated by arrows 46 in FIGS. 1 and 3, this being "toward" the entry end 30 of body channel 28. When the hook body has turned about halfway, or about 180 degrees, it passes through connector loop 44, as shown in FIG. 3. The loop must have a length somewhat greater than the dimension of the hook body from eye 12 to wire bight 24 in order to permit this rotation, and the hook body must be rotatable relative to the cord loop about an axis normal to the plane of the hook body, which requires only that the cord loop be engaged loosely in the eye. When the full turn of the hook body is completed, the parts have the relationship shown in FIG. 4, with target object 6 engaged in the extreme inner end of body channel 28, within wire bight 16. This condition may be regarded as a complete normal engagement of the hook, and is effectively very secure. Target object 6 cannot move to the open end of channel 28, and escape therefrom, without retracing its full entry path along said channel in a reverse direction, which is extremely unlikely to result from any looseness, shaking or vibration of the connection, and is further resisted by the close proximity of both reaches of connector loop 44 to the sides of the plane of channel 28, so that they effectively block and obstruct said channel against the movement of object 6 therethrough. About the only occurrence which could produce accidental disengagement would be some very unlikely type of movement, vibration or shaking of the connection which could conceivably produce an exact reversal of the rotation of the hook body which was required to complete the connection, and this is unlikely in the extreme both because any tension at all on the connection would keep the hook body longitudinally aligned in one direction to prevent rotation thereof in its own plane, and because of the extreme unlikelihood that any random shaking, vibration or other movement of the connection could produce the necessary continuity of movement to make such rotation of the hook body possible.

Nevertheless, however, and however slight, a chance of accidental disengagement of the connection as shown in FIG. 4 does exist, and an additional safety measure, producing ultimate security of the connection, may be taken in the following manner. When the hook body has been turned through a part of the full rotation described above, for example at the point in said rotation illustrated in FIG. 3, either side reach of cord loop 44 may be deflected laterally of itself, passed into channel 28 through entry 30 thereon, and advanced through said channel until it passes around wire bight 16. This of course requires that the transverse width of the channel be at least as great as the diameter of the cord used in the loop. Then, when rotation of the hook body is completed and the connection placed under tension, the loop will have the relationship to the hook body shown in FIGS. 5 and 6, with one reach of the cord loop extending through the channel laterally to the plane of the body. The cord reach passing through the channel blocks said channel positively against movement of target object 6 to the exit 30 of said channel. The more nearly the diameter of the cord approaches the width of the channel, the more effectively will said channel be blocked by the cord passing therethrough. It is quite possible that the cord diameter may exceed the width of the channel, so long as the cord is compressible, so that it must be laterally compressed to enter and move along the channel. It will be seen that if the side reach of cord loop 44 is inserted into channel 28 as described above, that is, after target object 6 has already entered the channel, the portion of the cord passing through the channel will "follow" the target object into the channel, and will not interfere with the insertion of the target object.

FIGS. 7, 8 and 9 illustrate a slight modification of structure not including a line loop 44, but in which the flexible line 10, while still a flexible rope or cord, forms its own connector member 8 simply by inserting its terminal end portion through eye 12, and securing it against withdrawal by any suitable enlargement thereof, for example by tying it in a knot 48 as shown, or by affixing an enlarged collar or the like to its extended portion. The operation of this modification is substantially similar to that of the species shown in FIGS. 1–6, except of course that, as shown in FIG. 8, the cord or rope overlies only one side of the channel 28 to obstruct movement of object 6 therethrough, and it is appreciably simpler and more economical. The cord may still be deflected laterally through channel entry 30 to extend laterally through said channel, as shown in FIG. 9, in the same manner as loop 44 in FIG. 6.

FIG. 10 shows a connector member 8 satisfactory for use when the flexible line 10 is of a sort not readily looped through or otherwise attached in eye 12 of the hook body, such as the linked chain 52 shown in FIG. 10. Somewhat the same considerations would apply if flexible line 10 were a broad strap of leather or the like. In such cases connector member 8 may consist of an elongated wire link 50 engageable at one end in eye 12 and at its opposite end in a link of chain 52. The link 50 may take many different forms, depending for example on the particular flexible line 10 to be engaged thereby, but as shown in FIGS. 10 and 11, consists of a single length of wire formed at one end to present an eye 54 through which the opposite end of the wire may be inserted, and locked against withdrawal by bending over its end, as indicated at 56. Said end is bent over as shown only after the link has been engaged in both eye 12 of the hook body and a link of chain 52. The operation of this species is substantially the same as that of the form shown in FIGS. 1-6, except of course that the link 50, being essentially rigid, cannot be deflected to extend laterally through channel 28. It is, however, better adapted for use with virtually any type of flexible line 10. If the added security of threading the connector laterally through the channel is desired, a flexible rope link 56, consisting of a length of rope having its ends secured together by clips 58, as shown in FIG. 12, may be substituted for wire link 50. Either wire link 50 or rope link 56 could be permanently mounted in eye 12 of hook body 4, and sold as a unit therewith.

While I have shown and described certain specific embodiments of my invention, it will be readily apparent that many minor changes of structure and operation could be made without departing from the spirit of the invention.

What I claim as new and desire to protect by Letters Patent is:

1. A fastener hook operable to interconnect a flexible line with a target member capable of being engaged by a hook, and comprising:
   a. a substantially planar and rigid hook body having a channel formed therein constituting a generally spiral slot of at least 360 degrees in angular extent, said slot formed through the thickness thereof, said slot opening at one end through an edge of the body whereby to be engageable over said target object and being closed at its opposite end, and being of sufficient transverse width to allow said target member to move therethrough to its closed end, and
   b. an elongated connector member permanently connected at one end to said hook body at a point generally internally of the spiral form of the channel formed therein, extending from said body member in a direction lying substantially in the plane thereof, said hook body being freely rotatable in its own plane relative to said connector member, about an axis normal to the plane of said body member.

2. A fastener hook as recited in claim 1 wherein the generally spiral form of the channel formed in said body is elongated in one direction in the plane of the body, and wherein the closed end of said channel and the point of attachment of said connector member to said body are disposed adjacent the respectively opposite ends of said elongated form.

3. A fastener hook as recited in claim 2 wherein said connector member is formed of pliably flexible material, whereby a portion thereof is deflectable laterally into and through said body channel, whereby to obstruct any passage of said target member longitudinally through said channel, the transverse width of said channel being sufficiently large to permit the passage of the connector material therethrough.

4. A fastener hook as recited in claim 2 wherein said connector member comprises an elongated loop threaded loosely at one end through an eye provided therefor in said hook body internally of the spiral form of said body channel, and extending from said body member in a direction parallel to the plane of said body, said link being of sufficient length to permit said body member to pass therethrough as it is rotated in its own plane, and being adapted to be connected at its opposite end to said flexible line, with the respective side reaches of said loop being disposed in close proximity to the sides of the body to overlie both sides of said channel.

5. A fastener hook as recited in claim 4 wherein said connector loop is formed of substantially rigid material.

6. A fastener hook as recited in claim 4 wherein said connector link is formed of pliably flexible material, wherein either side reach thereof is laterally deflectable and pressed into and through said body channel.

7. A fastener hook as recited in claim 2 wherein said connector member comprises a length of pliably flexible material threaded through an eye formed in said body member internally of the spiral form of the channel thereof, and having its extended portion enlarged to prevent its withdrawal from said eye.

8. A fastener hook as recited in claim 2 wherein said body channel is of substantially uniform width throughout its length, being open at one end through an edge of the body member, and then presenting, in sequence, a first curved portion opening toward the end of the body at which said connector member is connected, but at the opposite end of the elongated form of the spiral, a first straight portion, a second curved portion encircling the point of attachment of the connector member, and a second straight portion terminating in a closed end within the first curved portion.

9. A fastener hook as recited in claim 2 wherein said hook body is provided by a single length of wire, of sufficient strength to remain generally rigid in normal use, permanently formed in a single plane to provide first a substantially closed eye, within which one end of said connector member is joined, and then, successively, a first leg extending radially from said eye, a first reentrant bight opening toward the eye, a second leg parallel with but spaced apart from said first leg, a second reentrant bight concentrically surrounding the eye, a third leg extending parallel to but spaced apart from said first leg at the side thereof opposite from said second leg, a third reentrant bight concentrically surround said first bight, and a terminal leg extending parallel to but spaced apart from said second leg.

* * * * *